(12) United States Patent
Calkins et al.

(10) Patent No.: US 8,079,175 B2
(45) Date of Patent: Dec. 20, 2011

(54) FLYING INSECT TRAP

(75) Inventors: Mark Allen Calkins, Los Angeles, CA (US); Stephan Sutton, Valencia, CA (US)

(73) Assignee: Kittrich Corporation, La Mirada, CA (US)

( * ) Notice: Subject to any disclaimer, the term of this patent is extended or adjusted under 35 U.S.C. 154(b) by 404 days.

(21) Appl. No.: 12/114,750

(22) Filed: May 3, 2008

(65) Prior Publication Data

US 2010/0071254 A1 Mar. 25, 2010

Related U.S. Application Data

(60) Provisional application No. 60/916,796, filed on May 8, 2007.

(51) Int. Cl.
*A01M 1/04* (2006.01)
*A01M 1/14* (2006.01)

(52) U.S. Cl. ................. 43/114; 43/113; 43/115

(58) Field of Classification Search .......... 43/107, 43/113–117, 131; *A01M 1/04, 1/14*
See application file for complete search history.

(56) References Cited

U.S. PATENT DOCUMENTS

| | | | | |
|---|---|---|---|---|
| 3,708,908 | A | * | 1/1973 | Levey ............................. 43/114 |
| 4,979,329 | A | * | 12/1990 | Olive et al. ..................... 43/113 |
| 5,048,224 | A | * | 9/1991 | Frisch ............................. 43/114 |
| 5,398,442 | A | * | 3/1995 | Musket ........................... 43/114 |
| 6,758,009 | B1 | * | 7/2004 | Warner ........................... 43/113 |
| 6,866,858 | B2 | | 3/2005 | Nolen et al. |
| 7,343,710 | B2 | * | 3/2008 | Metcalfe ........................ 43/121 |
| 2005/0155277 | A1 | * | 7/2005 | Bagnall et al. ................. 43/113 |
| 2007/0094915 | A1 | * | 5/2007 | Plato et al. ..................... 43/114 |
| 2010/0263260 | A1 | * | 10/2010 | Engelbrecht et al. .......... 43/113 |

* cited by examiner

*Primary Examiner* — Son T Nguyen
*Assistant Examiner* — Shadi Baniani
(74) *Attorney, Agent, or Firm* — SNR Denton US LLP; Brian R. McGinley (57) ABSTRACT

The present invention is directed towards an improved flying insect trap, in the form of a housing and internal disposable portion. In one embodiment, the exterior portion comprises roof and body panels which are manufactured from a poster board paper stock that is printed on opposing sides with contrasting colors. The interior portion comprises a self-adhesive assembly constructed from a heavy weight chipboard material that is preferably white that surrounds an internal attractive element.

20 Claims, 6 Drawing Sheets

Fig. 6

FLYING INSECT TRAP

CROSS-REFERENCE TO RELATED APPLICATIONS

The present invention relies on, for priority, U.S. Provisional Patent Application No. 60/916,796, filed on May 8, 2007, and entitled "Disposable Flying Insect Lantern".

FIELD OF THE INVENTION

The present invention relates to flying insect traps, and more particularly to a disposable self-adhesive insect trap featuring a chemiluminescent light attractant combined with an evaporative chemical lure.

BACKGROUND OF THE INVENTION

Outdoor electric insect lanterns, featuring alternately polarized electrified grids that surround a light source, have enjoyed widespread use to control the presence of mosquitoes, biting flies, and other species of flying insects at night. During the operation of such devices, when an insect passes between the alternately polarized grids, an electric charge arcs between the grids and the insect, thus killing the insect. These lanterns become objectionable when the unsightly remains of insects become lodged within the grids, and when larger species of lifeless bugs fall through the bottom openings of these devices. Furthermore, the use of electric insect lanterns is limited to areas having a source of power to facilitate their operation.

Other devices used to control insects, such as mosquito coils containing insecticides in the family of pyrethrins, are not suitable for indoor usage because this chemical substance is known to irritate eyes, skin, and respiratory systems. Additionally, lit mosquito coils and aromatic repellants like citronella candles may not be used near flammable objects, materials or surfaces; and if left unattended, they are a potential source for fire.

Accordingly, it is an object of the present invention to provide a disposable flying insect trap that eradicates nighttime mosquitoes and biting flies without the use of electrified grids or toxic pesticides that may cause eye or respiratory irritations.

It is a further object of the invention to provide a disposable flying insect trap with a light attractant that emits light through a chemiluminescent reaction, and which further attracts insects with a scented evaporative chemical lure.

It is yet another object of the invention to provide a disposable flying insect trap having reflective white panels that are coated with a high tack self-adhesive to capture insects as they are attracted into the device.

Finally, an additional object of the invention is to provide a disposable flying insect trap that is made primarily from biodegradable components, and is designed to be collapsible so as to take up less space for shipping and final disposal.

These and other objects of the invention will be apparent to those skilled in this art from the following detailed description of the embodiments of the instant invention.

SUMMARY OF THE INVENTION

The present invention is directed to a disposable, or at least partially disposable, flying insect trap, comprising an exterior portion, further comprising at least one body panel and at least one roof panel; and an interior portion, further comprising at least one insect attractant and a self-adhesive assembly, wherein said exterior portion and said interior portion are removably connected.

Optionally, the at least one body panel and at least one roof panel are comprised of poster board paper stock. The poster board paper stock has a thickness of approximately 0.012 inch. The at least one body panel and said at least one roof panel comprise an inner surface and an outer surface. The inner surface and outer surface of said at least one body panel and said at least one roof panel are printed with contrasting colors. The inner surface is white. The outer surface is in a range of dark colors or imprints that reflect significantly less light than the interior surface. The at least one insect attractant is a light source. The light source is a chemiluminescent source. The chemiluminescent light source is a light stick. The light source is housed in a transparent plastic lens. The at least one insect attractant is an evaporative chemical. The self-adhesive assembly comprises a heavy weight chipboard material. The heavy weight chipboard material has a thickness of approximately 0.048 inch. The heavy weight chipboard material is coated with a high tack self-adhesive resin. The heavy weight chipboard material is further coated with a removable silicon sheet. The exterior portion and said interior portion are collapsible for ease of shipping and disposal.

In another embodiment, the present invention is directed to a partially disposable flying insect lantern, comprising an exterior portion, further comprising at least one body panel and at least one roof panel; and an interior portion, further comprising a light source and a self-adhesive assembly, wherein said exterior portion and said interior portion are removably connected and said interior portion is collapsible. Optionally, the exterior portion is collapsible and disposable.

In another embodiment, the present invention is directed to a disposable flying insect lantern, comprising an exterior portion, further comprising at least one body panel and at least one roof panel, wherein said at least one body panel and at least one roof panel are comprised of poster board paper stock and painted on opposite sides with opposing colors; and an interior portion, removably connected to said exterior portion, further comprising a chemiluminescent light source and a self-adhesive assembly, wherein said self-adhesive assembly comprises a heavy weight chipboard material that is coated with a high tack self-adhesive resin, which is further coated with a removable silicon sheet.

The aforementioned and other embodiments of the present invention shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION OF THE INVENTION

The present invention is directed towards an improved flying insect trap, in the form of a lantern and manufactured primarily from biodegradable materials, further comprising an exterior portion and interior portion. In one embodiment, the exterior portion comprises roof and body panels of the lantern which are manufactured from a poster board paper stock that is printed on opposing sides with contrasting colors. In one embodiment, the interior portion comprises a self-adhesive assembly constructed from a heavy weight chipboard material that is preferably white.

The present invention is directed toward multiple embodiments. Reference will now be made in detail to specific embodiments of the invention. Various modifications to the specific embodiment will be readily apparent to those of ordinary skill in the art, thus, language used in this specification should not be interpreted as a general disavowal of any one specific embodiment or used to limit the claims beyond the meaning of the terms used therein.

In one embodiment, the present invention is directed towards an improved flying insect trap, in the form of a lantern, in which the outer surface (exterior facade) of the exterior portion of the lantern is rendered from poster board paper stock in a range of dark colors or imprints that reflect significantly less light than the inner surface the device. In one embodiment, the interior surface of the exterior portion of the device is white in order to provide for greater reflectivity. This particular color scheme accentuates the lighted interior of the lantern to lure flying insects into the device.

Typically, the poster board paper stock used in the present invention is provided on large reels and may be cut to a predetermined size, shape and configuration through the use of rotary dies. It should be known to those of ordinary skill in the art, however, that pre-sheeted material and other conventional die-cut techniques may also be used to achieve the same outcome. The body panels of the lantern have a selected arrangement of stylized die cut openings of sufficient dimension to facilitate the entry of flying insects into the trap; in one embodiment, the roof panels also have such openings. The lower flap portions of the body panels define an additional opening through the underside of the lantern to maximize the access of airborne insects.

In a further embodiment, the present invention is directed towards an improved flying insect trap, in the form of a lantern, in which the interior portion further comprises a self-adhesive assembly fabricated from two interlocking panels that are made from heavy weight chipboard material. In one embodiment, the panels are coated on both sides with a transparent high tack self-adhesive resin—similar to the adhesive used for fly tape—and covered with a protective silicone release sheet. In one embodiment, the chipboard panels are white, so as to achieve the greatest degree of reflectivity from the light attractant.

After the panels are covered with a release sheet, they are die cut into interconnecting male and female component pieces, each having a slot dimensioned to accommodate the insertion of a transparent plastic lens that houses the attractant, and each having a corresponding slot to facilitate interlocking the panels into an assembly. At least one of the chipboard panels has male notches, projecting from the edge of the interior lens housing slot, which are designed to engage with openings die cut into the transparent plastic lens. The foot of each panel is additionally die cut with a pair of male notches extending from the bottom corner edges of each panel, and dovetail with slotted openings located at the bottom corners of the lantern body. This arrangement of notches and slots provide support for the trap when it is suspended upon final usage.

In one embodiment of the present invention, a chemiluminescent light source is used as an attractant to lure mosquitoes, biting flies, and other species of flying insects into the device. Chemiluminescence is the emission of light without emission of heat as the result of a chemical reaction, which is achieved through a liquid-phase reaction between hydrogen peroxide and a phenyl oxalate ester. Light sticks are transparent plastic tubes containing such ingredients, and are widely used as light sources in various settings such as by campers, recreational divers, and for entertainment at parties. Also known as glow sticks, the transparent plastic tube contains a mixture of a fluorescent dye and a derivative of phenyl oxalate ester, such as the type that is sold under the registered trademark CYALUME by American Cyanamid or its licensees. A glass vial containing hydrogen peroxide is also contained within the transparent plastic tube; rupturing the vial and shaking the tube combines the ingredients to produce light. By adjusting the concentrations of the two reactive chemicals, manufacturers can create glow sticks that can produce light for several hours. In the case of the present invention, it is desirable that such glow sticks emit light for a period of four to eight hours, and also have transparent casings that are injection molded with a plastic hook to facilitate the final suspension of the assembled trap.

In a further embodiment of the invention, an evaporative chemical is used as an additional attractant to make the device more effective by luring certain species of airborne insects to the trap so that they may be captured and killed. One such chemical attractant is described within U.S. Pat. No. 6,866,858, which is herein incorporated by reference, and marketed under the registered trademark OCTENOL® by Bedoukian Research or its licensees, and may be compounded into a porous medium or vehicle suitable for releasing effective amounts of the attractant into the environment. While the chemical itself does not kill insects—and is not harmful to humans, the environment, or other non-target organisms—its use increases the efficiency of the present invention. Although other attractants may be used, an example of such a porous medium or vehicle is a polyester membrane material having micropores encasing a block of attractant-saturated fibers marketed under the registered trademark WORLD OF FRAGRANCE® by Waterbury Companies, Inc. Within the present invention, the polyester microporous membrane is encased in a protective foil pouch, mounted to the underside of the lantern roof panel, and opened upon activation of the trap.

In yet another embodiment, the present invention is directed towards an improved flying insect trap that is constructed from collapsible components, so as to take up less space for shipping and final disposal. The lantern roof, lower body panels and transparent plastic lens all fold in upon themselves so as to conveniently fit within a flat retail package containing the unassembled self-adhesive chipboards, light stick and the evaporative chemical attractant. Although the lantern roof, body panels and transparent lens may be packaged as unassembled die cut pieces, in one embodiment these particular components are partially assembled—by joining adherent seams of the individual pieces to form collapsible component parts—facilitating ease in final assembly of the present invention for the end user. The present invention may then be dismantled into its component pieces after the light attractant and evaporative chemical lure have been fully exhausted.

Reference will now be made to the drawings. One of ordinary skill in the art would appreciate that the drawings referenced herein are only exemplary and changes may be made to the overall dimensions and structure of the lantern without changing its overall purpose and function.

Figure 1:
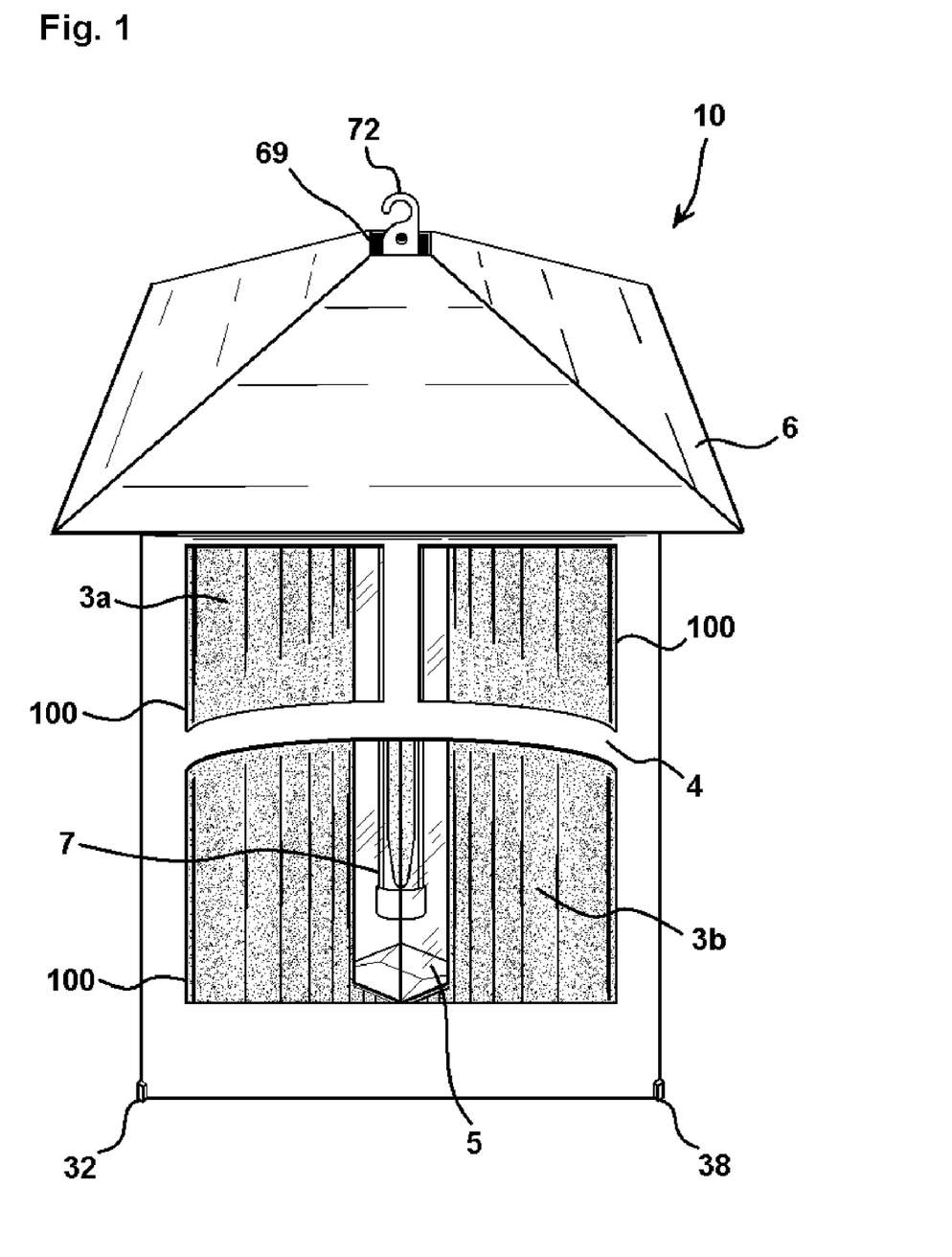
FIG. 1 is a perspective view of a first embodiment of the present invention.
Figure 2:
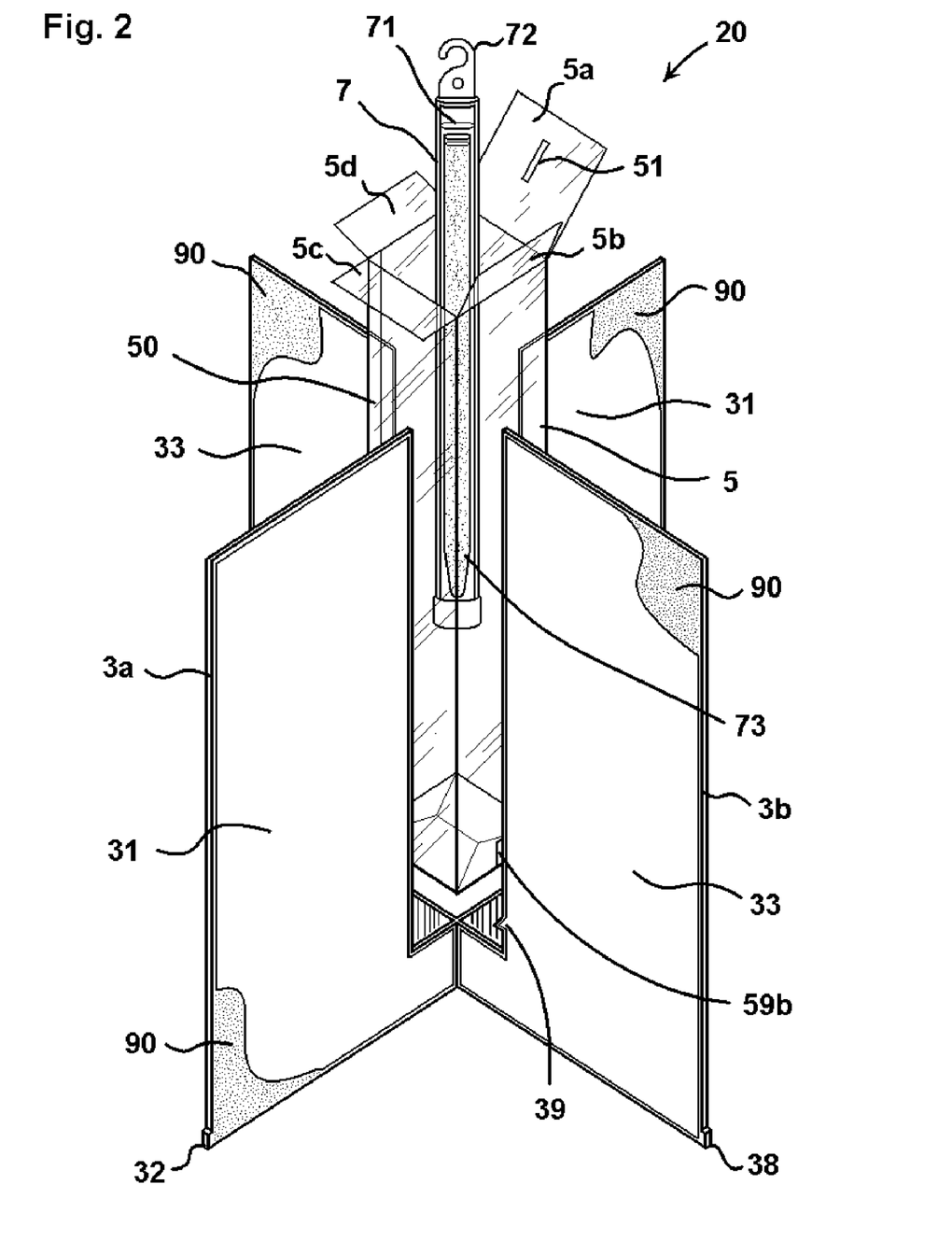
FIG. 2 is a perspective view of the interior portion of the device illustrated in FIG. 1, showing an embodiment of the self-adhesive assembly contained within the device, including a light stick and transparent polyethylene lens.

Referring now to FIGS. 1 and 2, disposable flying insect lantern 10 comprises an exterior portion further comprising at least one body panel 4 and a roof panel 6 which encloses an interior portion comprising self-adhesive assembly 20, formed from interlocking panels 3*a* and 3*b*. In one embodiment, self-adhesive assembly further comprises a chemiluminescent light source 7 housed within a plastic transparent lens container 5.

The exterior panels 4 and 6 are fashioned from a poster board material that, in one embodiment, has a thickness of approximately 0.012 inch. In one embodiment, exterior panels 4 and 6 are printed with contrasting colors on opposing sides. The outer surface (exterior facade) of the lantern 10 may be rendered from a range of dark colors or imprints that reflect significantly less light than the interior of the device, which, in one embodiment, is white. This particular color scheme accentuates the interior of the lantern to lure flying insects into the device.

Exterior body panel 4 is die cut with stylized apertures 100, which are of sufficient dimension to permit the access of airborne insects into the device. It should be understood by those of ordinary skill in the art that a variety of stylized apertures with an array of configured die cut openings may be used without departing from the scope of the present invention. The roof panel 6 is, in one embodiment, in the shape of a four-sided pyramid with sides that slope to meet an opening defined by edge 69, facilitating the projection of injection molded hook 72 of light stick 7. The roof panel may also be die cut with a series of stylized openings, and is held in place by inserting a ring (not shown) through the hole of molded hook 72 to essentially spring load the roof assembly 6 against the lower body panel 4. It is further contemplated that a variety of geometric shapes, such as a tapering cone, may be used to define the roof panel.

Figure 3A:
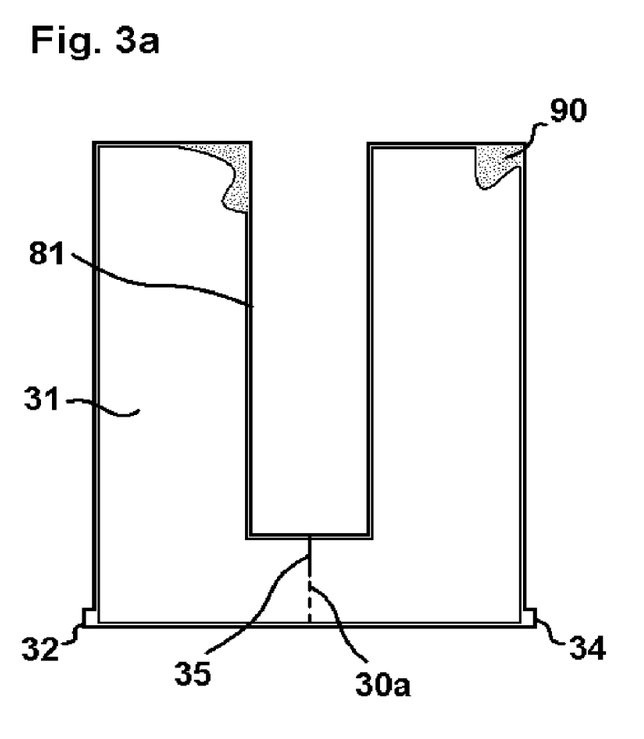
FIGS. 3a and 3b are planar views showing two die cut chipboard panels, with protective silicone release sheets covering high-tack adhesive, used within the self-adhesive assembly shown in FIG. 2.
Figure 3B:
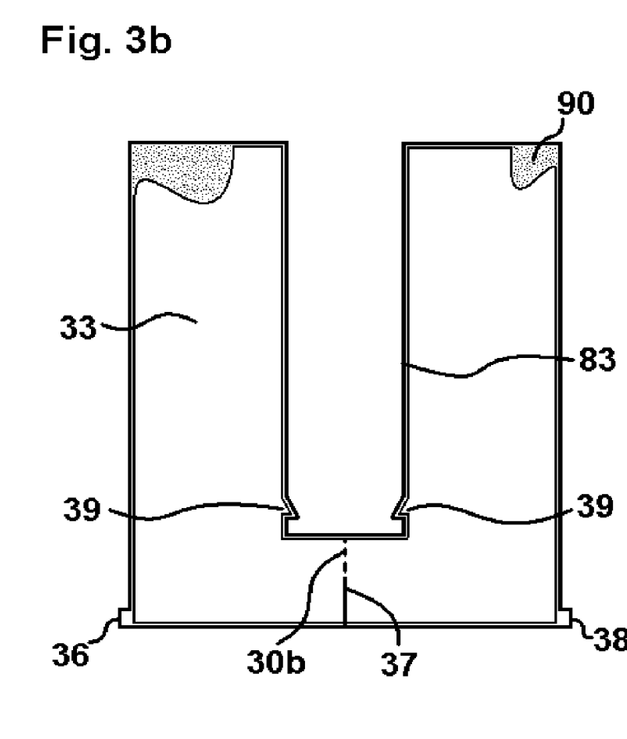

Referring again to FIG. 2, in addition to FIGS. 3*a* and 3*b*, as a further embodiment of the invention, the self-adhesive assembly 20 is contained within disposable insect lantern 10, and fabricated from two interlocking panels 30*a* and 30*b*, which are made from a heavy weight chipboard material that, in one embodiment, is approximately 0.048 inch in thickness.

To achieve the greatest surface area of adhesion, the chipboard panels are coated on both sides with a transparent high tack self-adhesive resin 90. The self-adhesive resin 90 is similar to that used to make fly tape, and covered with protective silicone release sheets 31 and 33, which are removable and preferably removed prior to use. The chipboard panels, in one embodiment, are white, so as to achieve the greatest degree of reflectivity from the light attractant 7.

After the chipboard panels are covered with protective silicone release sheets 31 and 33, they are die cut into the interlocking male and female panels 30*a* and 30*b*, shown in FIGS. 3, (or 3*a* and 3*b* as shown in FIGS. 1, 2, 4 and 5) each having slots 81 and 83 dimensioned to accommodate the insertion of a transparent lens 5 that houses the chemiluminescent light attractant 7, and each having a corresponding slot 35 and 37 to facilitate interlocking of the panels into an assembly. At least one of the chipboard panels 30*b* has male notches 39, projecting from the edge of the interior lens housing slot 83, which are designed to engage with openings 59*b* (shown in FIG. 1) die cut into the transparent lens 5. The foot of each panel is additionally die cut with a pair of male notches 32, 34 and 36, 38 extending from the bottom corner edges of each panel 3*a* and 3*b*, respectively, and dovetail with corresponding slotted openings 42, 44, 46, and 48—seen in FIG. 4*a*—located at the bottom of lantern body 4. This arrangement of notches and slots provide support for the lantern 10 when it is suspended by hook 72 during usage after final assembly.

In one embodiment of the present invention, a chemiluminescent light source, in the form of a light stick 7, is one attractant used to lure mosquitoes, biting flies, and other species of flying insects into the lantern 10. The light stick is a transparent plastic tube containing a mixture 71 of fluorescent dye and a phenyl oxalate ester, such as the type that is sold under the registered trademark CYALUME by American Cyanamid or its licensees. A glass vial containing hydrogen peroxide 73 is also contained within the plastic tube; rupturing the vial and shaking the tube combines the ingredients to produce light. By adjusting the concentrations of the two reactive chemicals 71 and 73, manufacturers can create light sticks that can produce light for several hours. It is further contemplated that a light stick using a light emitting diode (LED), of the kind marketed under the brand name BANDI LIGHT STICK by Gilla C&I of South Korea, would provide a suitable alternative to a chemical glow stick provided by the present invention.

As illustrated in FIGS. 2, 3*a* and 3*b*, the self-adhesive assembly 20 is constructed by joining corresponding slots 35 and 37, which interlock panels 3*a* (30*a*) and 3*b* (30*b*). A transparent rectangular lens 5, which, in one embodiment, is a clear polyethylene terephthalate (PET) plastic material, is inserted within the corresponding opening created by die cut slots 81 and 83 of panels 3*a* and 3*b*, respectively. The rectangular lens 5 may be formed by die cutting PET material and adhering edge portions to form a seam 50, thereby defining a hollow tube to insert light stick 7—it is contemplated that a hollow transparent cylinder may be used as well. At least two opposing apertures, such as 59*b*, are die cut into the lower portion of the lens to receive the pair of male notches 39 projecting from slot 83 of the self-adhesive panel 3*b* (30*b*). The protective silicone release sheets 31 and 33 are then removed along perforations, which can be located anywhere on the surface of the panels but preferably along slits 35, 37, to prepare the self-adhesive assembly 20 for insertion into the lower portion of lantern 10, which is defined by body panel 4.

Figure 4A:
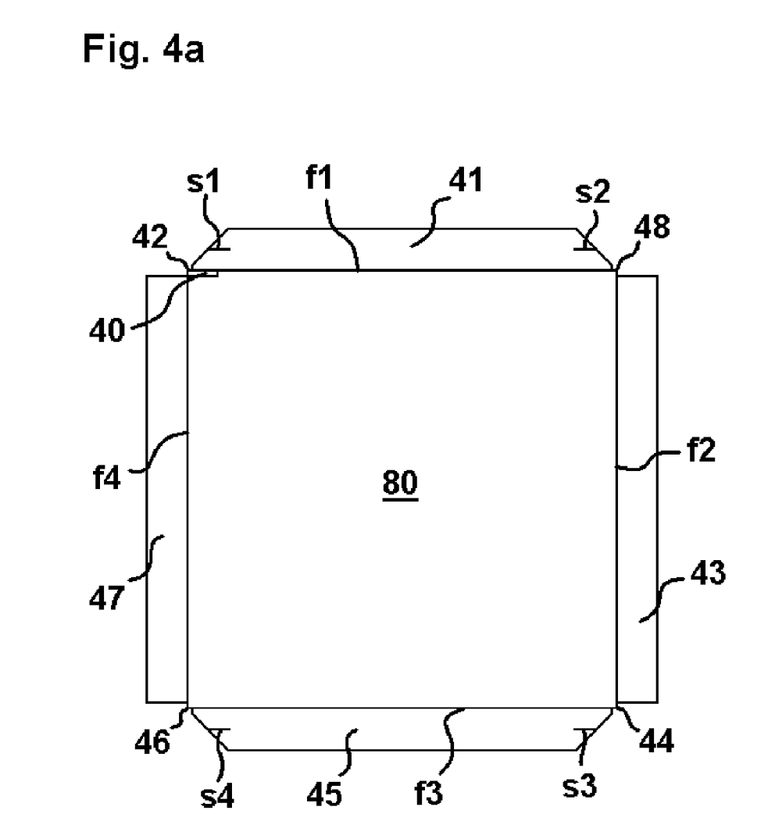
FIGS. 4a and 4b are bottom plan views of the die cut poster board panels of the device illustrated in FIG. 1, which define the lower lantern body before and after insertion of the self-adhesive assembly illustrated in FIG. 2.
Figure 4B:
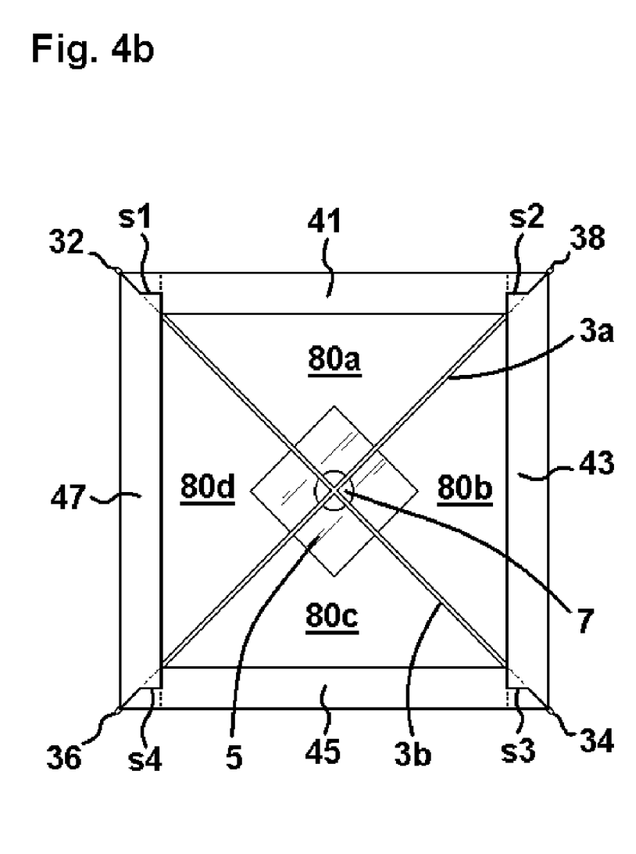

As seen within FIGS. 4*a* and 4*b*, the lower body panel 4 is fashioned from at least one die cut sheet of poster board material, with adhering edge portions that form seam 40, delineating an opening 80, for which to insert the self-adhesive assembly 20 of the present invention. The bottom edges of lower body panel 4 are die cut with slots 42, 44, 46, and 48 to correspond with notches 32, 34, 36, and 38 of self-adhesive assembly 20. The bottom edges are further die cut with flap portions 41, 43, 45, and 47 that are defined by scored fold lines f1, f2, f3, and f4, respectively. The flap portions 41 and 45 are beveled and incised with slots s1, s2, s3, and s4 so that they may be interlocked with flaps 43 and 47. The self-adhesive assembly 20 is then inserted through opening 80 to subdivide the area into four distinctive open compartments 80*a*, 80*b*, 80*c*, and 80*d* to inhibit the movement of airborne insects after they have entered the trap. The flap portions 41, 43, 45, and 47 are then folded inward and secured with the incised slots s1-s4 provided. The leading edges of flap portions 41-47 additionally define an opening for flying insects to enter compartments 80a-80d through the bottom of the present invention 10.

Figure 5:
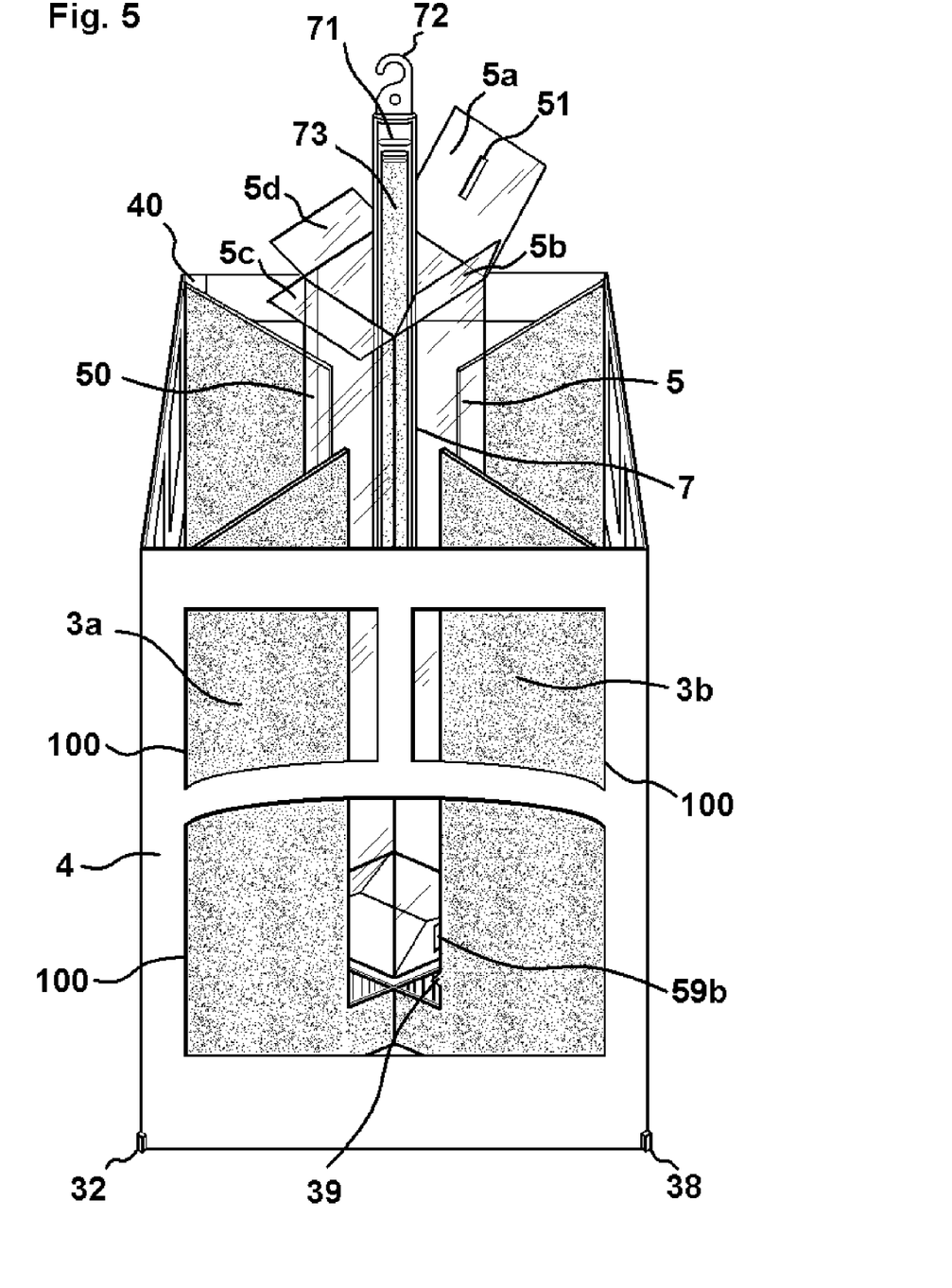
FIG. 5 is a perspective view, similar to FIGS. 1 and 2, showing the construction of the lower lantern body, with parts broken away, in accordance to the present invention.

FIG. 5 illustrates the assembled lower body portion 4, according to the present invention. After activation, the light stick 7 is lowered into place within the transparent rectangular lens 5 provided. The hook 72 of the light stick is inserted through aperture 51, and flap portions 5a, 5b, 5c, and 5d are folded inward and secured to suspend the light within the lens. The lantern is then in position to be covered by roof panel 6.

Figure 6:
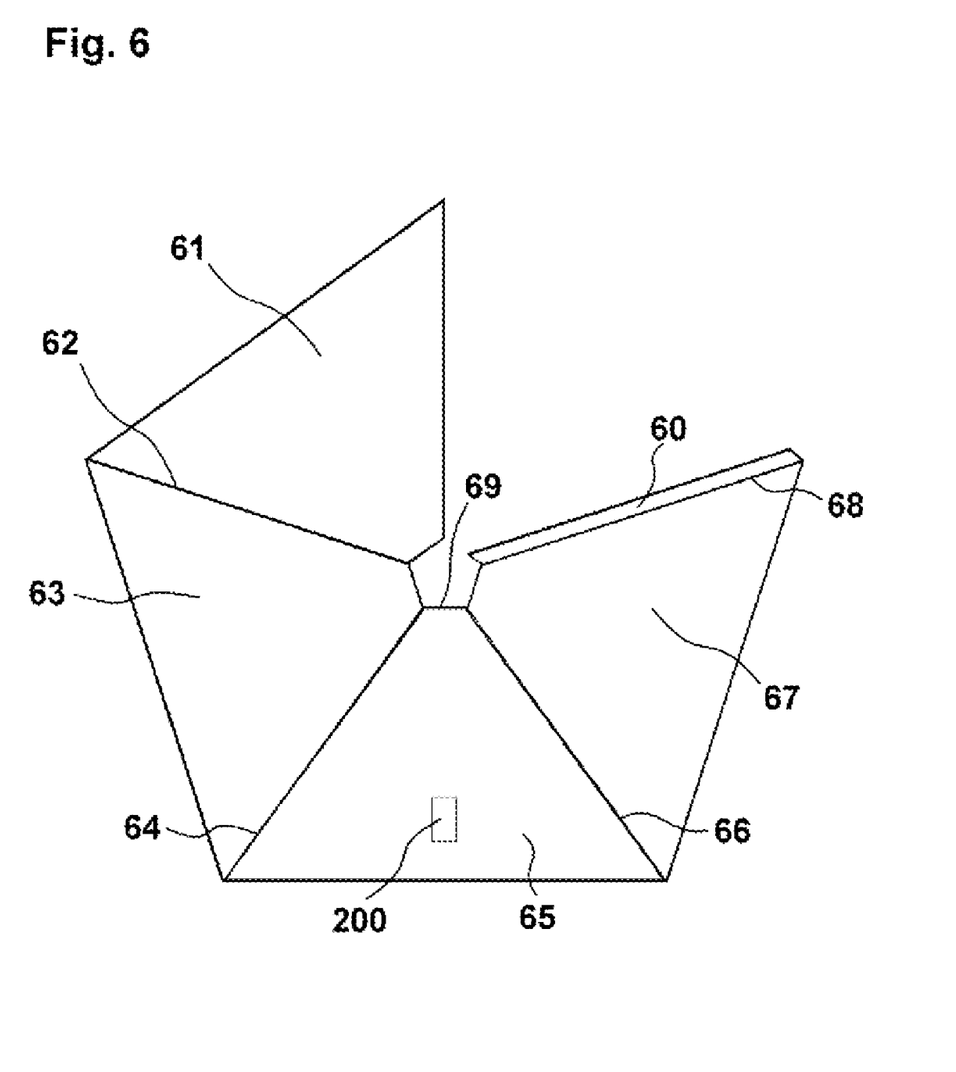
FIG. 6 is a plan view of the unfolded roof panel, used to enclose the present invention illustrated in FIG. 1, showing embodiments of the panel shape, fold lines, and location of the evaporative chemical lure.

Within a further embodiment of the present invention, and as seen in FIG. 6, an evaporative chemical lure 200 is mounted to the underside of roof panel 6, and is used as a secondary attractant to draw in certain species of airborne insects. One such chemical attractant is marketed under the registered trademark OCTENOL by Bedoukian Research or its licensees, and is used to saturate a microporous polyester membrane that is encased within a protective foil pouch. While the chemical itself does not kill insects—and is not harmful to humans, the environment, or other non-target organisms—its use increases the efficiency of the present invention once the protective pouch has been opened. The roof panel 6, is die cut from at least one piece of poster board material, and is generally in the shape of an even pentagon—although other geometric shapes may be used to form the roof panel. In one embodiment, the assembled upper roof panel 6 is in the shape of a four-sided pyramid, with triangular shaped sides 61, 63, 65, and 67 that slope to meet an opening defined by edge 69. The sides 61, 63, 65, and 67 are delineated by scored fold lines 62, 64, 66, and 68. The roof panel 6 is then assembled by securing adherent edge 60 to the leading edge portion of triangular shaped side 61.

In yet another embodiment of the invention, an improved flying insect trap 10 is provided that is constructed from collapsible components, so as to take up less space for shipping and final disposal. The lantern roof 6, lower body panels 4, and transparent plastic lens 5 all fold in upon themselves so as to conveniently fit with a flat retail package containing the unassembled self-adhesive chipboards 3a and 3b, light stick 7, and the evaporative chemical attractant 200. Although the lantern roof, lower body panels and transparent lens may be packaged as unassembled die cut pieces, in one embodiment these components are partially assembled—by joining adherent seams 40, 50, and 60 within each component part to form collapsible pieces—facilitating ease in the final assembly of the present invention 10 for the end user. The present invention may then be dismantled into its component parts after the light attractant 7 and evaporative chemical lure 200 have been fully exhausted.

As previously stated, the present invention has numerous alternative embodiments. First, regarding the exterior portion, the configuration can adopt any shape, not just a lantern. For example, the exterior portion can comprise any geometrical pattern, such as a cube, sphere or cylinder, with panel, or curved section, portions appropriately sized therefor. Further, the exterior portion could be made of non-disposable material, e.g. metal, and intended to be used as a permanent housing for a disposable interior portion. Second, the disposable interior portion can comprise any number of internal panels, in any configuration, including two intersecting panels (or 3, 4, 5, or more intersecting panels), thereby creating more area to capture the inserts. It should be appreciated that there is a natural limit to the number of panels—too many panels and the interior attractive element (e.g. chemiluminescent light) may not be sufficiently visible. Third, the hooking mechanism can be achieved by mechanisms other than a hook on the chemiluminescent light, e.g. hooks on the exterior portion, adhesive on the exterior portion.

While an embodiment of the invention has been shown in the drawings and described, since variations in the embodiment will be apparent to those skilled in the art, the invention should not be construed as limited to the specific form shown and described above.

The invention claimed is:

1. A disposable flying insect trap, comprising:
an exterior portion, further comprising at least one body panel and at least one roof panel; and
an interior portion, further comprising at least one insect attractant having a hook; and a self-adhesive assembly, wherein the self-adhesive assembly comprises a first panel having a first slot and a second panel having a second slot, wherein said first slot is detachably mate with said second slot, and wherein, when said first slot mates with said second slot, the first panel interlocks with said second panel forming a space for receiving said insect attractant; and a lens container having a plurality of flap portions, wherein said plurality of flap portions define an aperture, wherein said hook is inserted into said aperture;
wherein said exterior portion and said interior portion are removably connected.

2. The insect trap of claim 1 wherein said at least one body panel and said at least one roof panel are comprised of poster board paper stock.

3. The insect trap of claim 2 wherein said poster board paper stock has a thickness of approximately 0.012 inch.

4. The insect trap of claim 1 wherein said at least one body panel and said at least one roof panel comprise an inner surface and an outer surface.

5. The insect trap of claim 4 wherein the inner surface and outer surface of said at least one body panel and said at least one roof panel are printed with contrasting colors.

6. The insect trap of claim 5 wherein said inner surface is white.

7. The insect trap of claim 5 wherein said outer surface is in a range of dark colors or imprints that reflect significantly less light than the interior surface.

8. The insect trap of claim 1 wherein the at least one insect attractant is a light source.

9. The insect trap of claim 8 wherein said light source is a chemiluminescent source.

10. The insect trap of claim 9 wherein said chemiluminescent light source is a light stick.

11. The insect trap of claim 9 wherein said light source is housed in a transparent plastic lens.

12. The insect trap of claim 1 wherein the at least one insect attractant is an evaporative chemical.

13. The insect trap of claim 1 wherein said self-adhesive assembly comprises a heavy weight chipboard material.

14. The insect trap of claim 13 wherein said heavy weight chipboard material has a thickness of approximately 0.048 inch.

15. The insect trap of claim 13 wherein said heavy weight chipboard material is coated with a high tack self-adhesive resin.

16. The insect trap of claim 15 wherein said heavy weight chipboard material is further coated with a removable silicon sheet.

17. The insect trap of claim 1 wherein said exterior portion and said interior portion are collapsible for ease of shipping and disposal.

18. A partially disposable flying insect lantern, comprising:
- an exterior portion, further comprising at least one body panel and at least one roof panel; and
- an interior portion, further comprising a light source and a hook; and a self-adhesive assembly, wherein said exterior portion and said interior portion are removably connected and said interior portion is collapsible and wherein the self-adhesive assembly comprises a first panel having a first slot and a second panel having a second slot, wherein said first slot is detachably mate with said second slot, and wherein, when said first slot mates with said second slot, the first panel interlocks with said second panel forming a space for receiving an insect attractant; and a lens container having a plurality of flap portions, wherein said plurality of flap portions define an aperture, wherein said hook is inserted into said aperture.

19. The partially disposable flying insect lantern of claim 18 wherein the exterior portion is collapsible and disposable.

20. A disposable flying insect lantern, comprising:
- an exterior portion, further comprising at least one body panel and at least one roof panel, wherein said at least one body panel and at least one roof panel are comprised of poster board paper stock and painted on opposite sides with opposing colors; and
- an interior portion, removably connected to said exterior portion, further comprising a chemiluminescent light source and a hook; and a self-adhesive assembly, wherein said self-adhesive assembly comprises a heavy weight chipboard material that is coated with a high tack self-adhesive resin, which is further coated with a removable silicon sheet and wherein the self-adhesive assembly comprises a first panel having a first slot and a second panel having a second slot, wherein said first slot is detachably mate with said second slot, and wherein, when said first slot mates with said second slot, the first panel interlocks with said second panel forming a space for receiving said chemiluminescent light source; and a lens container having a plurality of flap portions, wherein said plurality of flap portions define an aperture, wherein said hook is inserted into said aperture.

* * * * *